United States Patent
Kumar et al.

(10) Patent No.: US 9,684,736 B2
(45) Date of Patent: Jun. 20, 2017

(54) COMMUNICATION HANDLER FOR FLEX INTEGRATION WITH A SECURE APPLICATION

(75) Inventors: Darshan Kumar, San Ramon, CA (US); Ambili Sudhi, Bangalore (IN); Govindraja Achar, Bangalore (IN); Pankesh Jhaveri, North Brunswick, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 518 days.

(21) Appl. No.: 12/362,416

(22) Filed: Jan. 29, 2009

(65) Prior Publication Data

US 2010/0191700 A1 Jul. 29, 2010

(51) Int. Cl.
*G06F 17/30* (2006.01)

(52) U.S. Cl.
CPC .... *G06F 17/30917* (2013.01); *G06F 17/3056* (2013.01)

(58) Field of Classification Search
CPC .......... G06F 17/3056; G06F 17/30917; G06Q 10/0631; G06Q 10/10; G06Q 30/02
See application file for complete search history.

(56) References Cited

U.S. PATENT DOCUMENTS

| | | | |
|---|---|---|---|
| 6,055,507 A | 4/2000 | Cunningham | |
| 6,161,176 A | 12/2000 | Hunter et al. | |
| 6,178,439 B1 * | 1/2001 | Feit | 709/200 |
| 6,188,401 B1 | 2/2001 | Peyer | |
| 6,229,537 B1 | 5/2001 | Sobeski et al. | |
| 6,377,993 B1 | 4/2002 | Brandt et al. | |
| 6,430,591 B1 | 8/2002 | Goddard | |
| 6,453,302 B1 | 9/2002 | Johnson et al. | |
| 6,523,102 B1 | 2/2003 | Dye et al. | |
| 6,542,595 B1 | 4/2003 | Hemzal | |
| 6,624,831 B1 | 9/2003 | Shahine et al. | |
| 6,630,946 B2 | 10/2003 | Elliott et al. | |
| 6,636,863 B1 | 10/2003 | Friesen | |
| 6,683,943 B2 | 1/2004 | Wuelly | |
| 6,859,780 B1 | 2/2005 | Cunningham | |
| 6,944,829 B2 | 9/2005 | Dando | |
| 6,952,681 B2 | 10/2005 | McQuade et al. | |
| 6,963,826 B2 | 11/2005 | Hanaman et al. | |
| 6,990,454 B2 | 1/2006 | McIntosh | |
| 6,996,569 B1 | 2/2006 | Bedell et al. | |

(Continued)

OTHER PUBLICATIONS

Kunau ("Enterprise Architecture, Life Sciences, and Visualization", Oct. 4, 2006, http://kunau.us/general-interest/design/macromedia-flex-as-an-interface-builder-for-life-sciences-applications/).*

(Continued)

*Primary Examiner* — Shew-Fen Lin
(74) *Attorney, Agent, or Firm* — Miles & Stockbridge P.C.

(57) ABSTRACT

Systems and methods are provided for a global communication handler to facilitate communication between an Flex application and an Enterprise Application Server ("EAS") database. Data is obtained from the EAS database by the global communication handler, and the global communication handler instantiates at least one object that provides that data to a Flex application. The global communication handler also receives data from the Flex application, and writes that data to the EAS database.

16 Claims, 11 Drawing Sheets

(56) References Cited

U.S. PATENT DOCUMENTS

| | | | |
|---|---|---|---|
| 7,058,890 B2* | 6/2006 | George et al. | 715/728 |
| 7,107,548 B2 | 9/2006 | Shafron | |
| 7,179,751 B2 | 2/2007 | Smith et al. | |
| 7,219,127 B2 | 5/2007 | Huck et al. | |
| 7,222,305 B2* | 5/2007 | Teplov et al. | 715/751 |
| 7,240,070 B1 | 7/2007 | Man Cheng et al. | |
| 7,243,336 B2 | 7/2007 | Brockway et al. | |
| 7,249,053 B2 | 7/2007 | Wohlers et al. | |
| 7,406,534 B2 | 7/2008 | Syvanne et al. | |
| 7,467,355 B1 | 12/2008 | Zukowski et al. | |
| 7,590,939 B2 | 9/2009 | Sareen et al. | |
| 7,679,637 B1 | 3/2010 | Kohler | |
| 7,707,513 B2 | 4/2010 | Broda et al. | |
| 7,805,334 B1 | 9/2010 | Huppert | |
| 7,827,481 B1* | 11/2010 | Greenfield et al. | 715/236 |
| 7,836,403 B2 | 11/2010 | Viswanathan | |
| 7,956,869 B1 | 6/2011 | Gilra | |
| 8,020,083 B1* | 9/2011 | Kembel et al. | 715/201 |
| 8,229,969 B1* | 7/2012 | Floyd | 707/802 |
| 2001/0044731 A1 | 11/2001 | Coffman et al. | |
| 2002/0032501 A1 | 3/2002 | Tilles et al. | |
| 2002/0032582 A1 | 3/2002 | Feeney et al. | |
| 2002/0065683 A1 | 5/2002 | Pham et al. | |
| 2002/0085020 A1 | 7/2002 | Carroll | |
| 2002/0116418 A1 | 8/2002 | Lachhwani | |
| 2002/0133520 A1 | 9/2002 | Tanner | |
| 2002/0169795 A1 | 11/2002 | Elliott et al. | |
| 2002/0173990 A1 | 11/2002 | Marasco | |
| 2002/0188513 A1 | 12/2002 | Gil et al. | |
| 2003/0004840 A1 | 1/2003 | Gharavy | |
| 2003/0040953 A1 | 2/2003 | Kasler et al. | |
| 2003/0055713 A1 | 3/2003 | Pinto et al. | |
| 2003/0066032 A1 | 4/2003 | Ramachandran et al. | |
| 2003/0088442 A1 | 5/2003 | Michael et al. | |
| 2003/0123631 A1 | 7/2003 | Moss et al. | |
| 2003/0144857 A1 | 7/2003 | Lacour et al. | |
| 2003/0158947 A1 | 8/2003 | Bloch et al. | |
| 2003/0197366 A1 | 10/2003 | Kusterbeck | |
| 2003/0226111 A1* | 12/2003 | Wirts et al. | 715/514 |
| 2004/0017397 A1 | 1/2004 | Bach | |
| 2004/0024740 A1 | 2/2004 | McGeorge | |
| 2004/0032431 A1 | 2/2004 | Hymes | |
| 2004/0041841 A1 | 3/2004 | LeMogne | |
| 2004/0046789 A1 | 3/2004 | Inanoria | |
| 2004/0056894 A1 | 3/2004 | Zaika et al. | |
| 2004/0113934 A1 | 6/2004 | Kleinman et al. | |
| 2004/0138965 A1 | 7/2004 | Laughlin et al. | |
| 2004/0139176 A1 | 7/2004 | Farrell | |
| 2004/0141004 A1 | 7/2004 | Cabezas et al. | |
| 2004/0141016 A1 | 7/2004 | Fukatsu et al. | |
| 2004/0187127 A1 | 9/2004 | Gondi et al. | |
| 2004/0205343 A1 | 10/2004 | Forth et al. | |
| 2004/0225528 A1 | 11/2004 | Brock | |
| 2004/0254922 A1 | 12/2004 | Vincent | |
| 2004/0255232 A1 | 12/2004 | Hammond et al. | |
| 2004/0267813 A1 | 12/2004 | Rivers-Moore | |
| 2005/0039139 A1 | 2/2005 | Schwartz et al. | |
| 2005/0065756 A1 | 3/2005 | Hanaman et al. | |
| 2005/0076330 A1 | 4/2005 | Almgren | |
| 2005/0102192 A1 | 5/2005 | Gerrits et al. | |
| 2005/0108044 A1 | 5/2005 | Koster | |
| 2005/0108295 A1 | 5/2005 | Karimisetty et al. | |
| 2005/0125806 A1 | 6/2005 | Bussler et al. | |
| 2005/0172262 A1 | 8/2005 | Lalwani | |
| 2005/0198220 A1 | 9/2005 | Wada | |
| 2006/0010397 A1 | 1/2006 | Laffey | |
| 2006/0041879 A1 | 2/2006 | Bower | |
| 2006/0069785 A1 | 3/2006 | Barrett | |
| 2006/0074775 A1* | 4/2006 | Roman et al. | 705/27 |
| 2006/0085449 A1 | 4/2006 | Sattler et al. | |
| 2006/0122971 A1* | 6/2006 | Berg et al. | 707/3 |
| 2006/0129432 A1 | 6/2006 | Choi et al. | |
| 2006/0136843 A1 | 6/2006 | Shafron | |
| 2006/0190809 A1 | 8/2006 | Hejna, Jr. | |
| 2006/0247968 A1 | 11/2006 | Kadry | |
| 2006/0293930 A1 | 12/2006 | Rodgers et al. | |
| 2006/0294468 A1 | 12/2006 | Sareen et al. | |
| 2007/0016869 A1 | 1/2007 | Mukundan | |
| 2007/0016876 A1 | 1/2007 | Schultz | |
| 2007/0186167 A1 | 8/2007 | Anderson | |
| 2007/0192192 A1 | 8/2007 | Haberman et al. | |
| 2007/0192410 A1 | 8/2007 | Liversidge et al. | |
| 2007/0203785 A1 | 8/2007 | Thompson et al. | |
| 2007/0203851 A1 | 8/2007 | Sudhi | |
| 2007/0220039 A1 | 9/2007 | Waldman et al. | |
| 2007/0226027 A1 | 9/2007 | Chang | |
| 2007/0226082 A1* | 9/2007 | Leal | 705/27 |
| 2007/0283287 A1 | 12/2007 | Taylor et al. | |
| 2007/0294612 A1 | 12/2007 | Drucker et al. | |
| 2008/0075251 A1 | 3/2008 | Jefferson et al. | |
| 2008/0077941 A1 | 3/2008 | Holmes | |
| 2008/0103821 A1 | 5/2008 | Cerbone et al. | |
| 2008/0103856 A1* | 5/2008 | Ciszkowski et al. | 705/7 |
| 2008/0109286 A1 | 5/2008 | Johnson et al. | |
| 2008/0114709 A1 | 5/2008 | Dixon et al. | |
| 2008/0126179 A1* | 5/2008 | Norfolk et al. | 705/10 |
| 2008/0134077 A1 | 6/2008 | Cheng et al. | |
| 2008/0140449 A1 | 6/2008 | Hayes | |
| 2008/0172603 A1 | 7/2008 | Agarwal et al. | |
| 2008/0184157 A1 | 7/2008 | Selig | |
| 2008/0195504 A1 | 8/2008 | Wren | |
| 2008/0250433 A1 | 10/2008 | Orton et al. | |
| 2008/0255886 A1 | 10/2008 | Unkefer et al. | |
| 2008/0271059 A1 | 10/2008 | Ott et al. | |
| 2008/0281783 A1 | 11/2008 | Papkoff | |
| 2008/0320509 A1 | 12/2008 | Gustafson et al. | |
| 2009/0024647 A1 | 1/2009 | Hein | |
| 2009/0077170 A1* | 3/2009 | Milburn et al. | 709/203 |
| 2009/0125850 A1 | 5/2009 | Karstens | |
| 2009/0125907 A1 | 5/2009 | Wen et al. | |
| 2009/0172564 A1 | 7/2009 | Fish | |
| 2009/0210796 A1 | 8/2009 | Bhogal et al. | |
| 2009/0248646 A1 | 10/2009 | Probst et al. | |
| 2009/0249290 A1 | 10/2009 | Jenkins | |
| 2009/0254828 A1 | 10/2009 | Denoue et al. | |
| 2009/0265255 A1 | 10/2009 | Jackson et al. | |
| 2009/0282041 A1* | 11/2009 | Skaria et al. | 707/8 |
| 2009/0305217 A1 | 12/2009 | Mulcahy et al. | |
| 2009/0327934 A1 | 12/2009 | Serpico et al. | |
| 2010/0037168 A1 | 2/2010 | Thayne et al. | |
| 2010/0049699 A1 | 2/2010 | Benschoter et al. | |
| 2010/0088618 A1 | 4/2010 | Mayer-Ullmann | |
| 2010/0114985 A1 | 5/2010 | Chaudhary et al. | |
| 2010/0151846 A1 | 6/2010 | Vuong | |
| 2010/0161713 A1* | 6/2010 | Gangadharappa et al. | 709/203 |
| 2010/0332227 A1 | 12/2010 | Melamed et al. | |
| 2012/0030553 A1 | 2/2012 | Delpha | |

OTHER PUBLICATIONS

"Data Services Made Easy for Adobe Flex Applications", Sep. 23, 2007, http://ajax.sys-con.com/node/418939/print.*

Non-Final Office Action issued Dec. 7, 2010 in U.S. Appl. No. 12/363,371.

U.S. Appl. No. 12/363,385, Darshan Kumar.

U.S. Appl. No. 12/362,409, Darshan Kumar.

U.S. Appl. No. 12/363,402, Darshan Kumar.

U.S. Appl. No. 12/363,517, Darshan Kumar.

U.S. Appl. No. 12/362,398, Darshan Kumar.

U.S. Appl. No. 12/362,406, Darshan Kumar.

U.S. Appl. No. 12/363,411, Darshan Kumar.

U.S. Appl. No. 12/363,371, Darshan Kumar.

Oracle, "Siebel Mobile Solutions," Oracel Data Sheet, 2007, pp. 1-4.

U.S. Office Action U.S. Appl. No. 12/362,406 dated Mar. 21, 2011.

U.S. Office Action U.S. Appl. No. 12/363,411 dated Mar. 31, 2011.

U.S. Office Action U.S. Appl. No. 12/363,371 dated Mar. 25, 2011.

Office Action dated Jun. 8, 2011 issued in U.S. Appl. No. 12/362,409.

Oracle Siebel Life Sciences Guide, Version 7.7, Rev. C, Jun. 2007.

Oracle Siebel Life Sciences Guide, Version 7.8, Rev. C, May 2008.

(56) References Cited

OTHER PUBLICATIONS

Oracle Siebel Pharma Handheld Guide, Version 8.0, Rev. A, May 2007.
Oracle Data Sheet, "Siebel Mobile Solutions," Copyright 2007.
Oracle White Paper, "Oracle CRM for Life Sciences—Closed Loop Marketing Solution for the Pharmaceutical Sales Model," Copyright 2009.
Oracle White Paper, "Siebel Pharma Dynamic Sales Solution," Copyright 2006.
"Boehringer Inglhein Holland Experiences Significant Increase in Customer Satisfaction in 12 Months Using Siebel Pharma", Business Wire, NY p. 1, Mar. 2004.
"Business Update; CSSC Completes Siebel Systems Validations for Three Pharmaceutical Firms'", Health and Medicine Week, Atlanta, p. 346, May 25, 2006.
"Demantra Introduces Demantra Suite 4.0—Software That Offers Ten Times Return on Investment by Managing Product Demand"; Business Wire, NY, p. 1, Apr. 2, 2001.
"iAnywhere Prescribes Mobile Technology to Eli Lily's Italian Sales Team", PR Newswire, NY, p. 1, Mar. 22, 2004.
"Novo Nordisk Expands Siebel Pharma Deployment to Optimize European Sales Effectiveness", Business Wire, NY, p. 1, May 2003.
Oracle Licenses CIC's of eSignature Technology for Siebel Handheld for Pharma and Siebel Handheld for Service, PR Newswire, NY, Jan. 9, 2007.
Phoenix Territory Management System, incorporated by reference into Cerbone et al., U.S. Patent Application Publication No. 2008/0103821, publication date May 1, 2008.
Siebel Life Sciences Guide, Version 7.8, Rev. A Sep. 2005 pp. 1-108 http://www.erp100.com/document/Siebel/Version7.8/B31104_01/books/PDF/LSSIA.pdf.
Siebel Pharma Dynamic Sales for Pharmaceutical Biotechnology Companies, An Oracle White Paper, Customer Relationship Management and Business Analytics, Jun. 2006 http://www.oracle.com/us/industries/life-sciences/042929.pdf.
Siebel Pharma Handheld Guide, Version 7-7, Siebel Systems, Jun. 2004.
Siebel Pharma Handheld Guide, Version 7-8, May 2005 http://download.oracle.com/docs/cd/B31104_02/books/PDf/HHPharm.pdf.
Siebel Systems Inc., Siebel Enterprise Applications, Siebel Interactive Guide, Siebel 99, Version 5-5, 10PA1-A101-05500, Jun. 1999.
Siebel Life Sciences Guide, Version 7.8, Rev. A Sep. 2005 pp. 109-230 http://www.erp100.com/document/Siebel/Version7.8/B31104_01/books/PDF/LSSIA.pdf.
Siebel Life Sciences Guide, Version 7.8, Rev. A Sep. 2005 pp. 231-358 http://www.erp100.com/document/Siebel/Version7.8/B31104_01/books/PDF/LSSIA.pdf.
Siebel Life Sciences Guide, Version 7.8, Rev. A Sep. 2005 pp. 359-464 http://www.erp100.com/document/Siebel/Version7.8/B31104_01/books/PDF/LSSIA.pdf.
"The Telemarketing Sales Rule", Published by Consumers a Helpful Guide on Sep. 1, 2005, pp. 1 and 2.
Oracle Quality Implementation Guide, Release 12, Part No. B31579-01, Dec. 2006, http://docs.oracle.com/cd/B34956_01/current/acrobat/120qaig.pdf.
Final Office Action dated Sep. 15, 2016 issued in U.S. Appl. No. 12/363,517.
Office Action for related application U.S. Appl. No. 12/363,517 (mailed Apr. 26, 2016).
Blank et al. Flex Application Development. © 2008. Springer-Verlag. New York, NY. 483 pages.

\* cited by examiner

LONG TERM ASTHMA CONTROL

ARACID IS A LONG-TERM CONTROLLER MEDICATION CALLED A LEUKOTRIENE RECEPTOR ANTAGONIST. OF THE NEW CLASS OF ASTHMA MEDICINES CALLED LEUKOTRIENE BLOCKERS, ARACID IS THE FIRST DEVELOPED FOR BOTH ADULTS AND CHILDREN AS YOUNG AS SIX YEARS, AND THE FIRST AND ONLY DEVELOPED FOR ONCE-DAILY USE.

ARACID:
› IS NOT A STEROID
› WORKS BY BLOCKING LEUKOTRIENES
› SHOULD NOT BE USED FOR THE IMMEDIATE RELIEF OF ASTHMA ATTACKS OR TO PREVENT OR TREAT ASTHMA MADE WORSE BY EXERCISE

Aracid (BUDESONIDE/FORMATERAL)

ORACLE PERSONALIZED CONTENT FOR ANTONIA PINAS 610

TOTAL CONTROL | ARACID - PERFORMANCE | ARACID - RESPIRATORY PATHOG...

FIG. 7

COMMUNICATION HANDLER FOR FLEX INTEGRATION WITH A SECURE APPLICATION

FIELD OF THE INVENTION

One embodiment is directed to customer relationship management, and more particularly directed to Flex integration with a secure application.

BACKGROUND INFORMATION

In recent years, the annual rate of increase among physicians has remained relatively flat while the number of pharmaceutical sales representatives has grown considerably overall, even accounting for recent reductions in field force sizes. As a result, sales call effectiveness has waned in the face of a changing market and physicians' increasingly busy schedules, forcing life sciences organizations to transform their sales and marketing capabilities. Pharmaceutical companies face stiff challenges in terms of completion, cost escalation and reduction in margins, while promoting their products by sending out sales representatives to doctors, hospitals and other medical organizations. Typically the sales representatives, in the few minutes that they get with the audience/doctors, orally explain the complicated details of the medical product and then give handouts, such as presentation material on the product in paper form. A very likely result of such an approach is that after the session the audience would have already forgotten much, depending on the oral presentation skills of the representative, and the handouts most likely be thrown away. A more effective approach would be to provide the sales representative with an animated presentation that would be more engaging for the little time allotted to the presentation. Technology such as Adobe® Flex or Windows® Silverlight would be useful in designing and presenting animated movies about products. However, such technology is client-side and uses scripting, making it too insecure for use with the secure enterprise application systems, such as Oracle® Life Sciences, used by pharmaceutical companies.

SUMMARY OF THE INVENTION

One embodiment is method for a global communication handler to facilitate communication between a Flex application and a platform database. The method comprises obtaining first data from the platform database, instantiating at least one object that provides the first data to the Flex application, receiving second data from Flex application, and writing the second data to the platform database.

BRIEF DESCRIPTION OF THE DRAWINGS

FIG. 3 illustrates an example user interface ("UI") of the PCD system in accordance with an embodiment;

FIG. 6 illustrates an example presentation UI of the PCD system in accordance with an embodiment;

FIG. 7 illustrates another example call details UI of the PCD system in accordance with an embodiment;

DETAILED DESCRIPTION

Systems and methods in accordance with an embodiment facilitate communication between an Adobe® Flex application and a base platform that is a secure application, such as Oracle® Life sciences. The system comprises the base platform, an ActiveX control container provided by the base platform to communicate via Javascript, and a container web page including a Flex application and a Javascript function to invoke the Flex application, wherein the base platform can invoke the Flex application. Accordingly, the rich user interface of a Personalized Content Delivery ("PCD") system may be used with a base platform that does not allow communication via scripting for security concerns.

Figure 1:
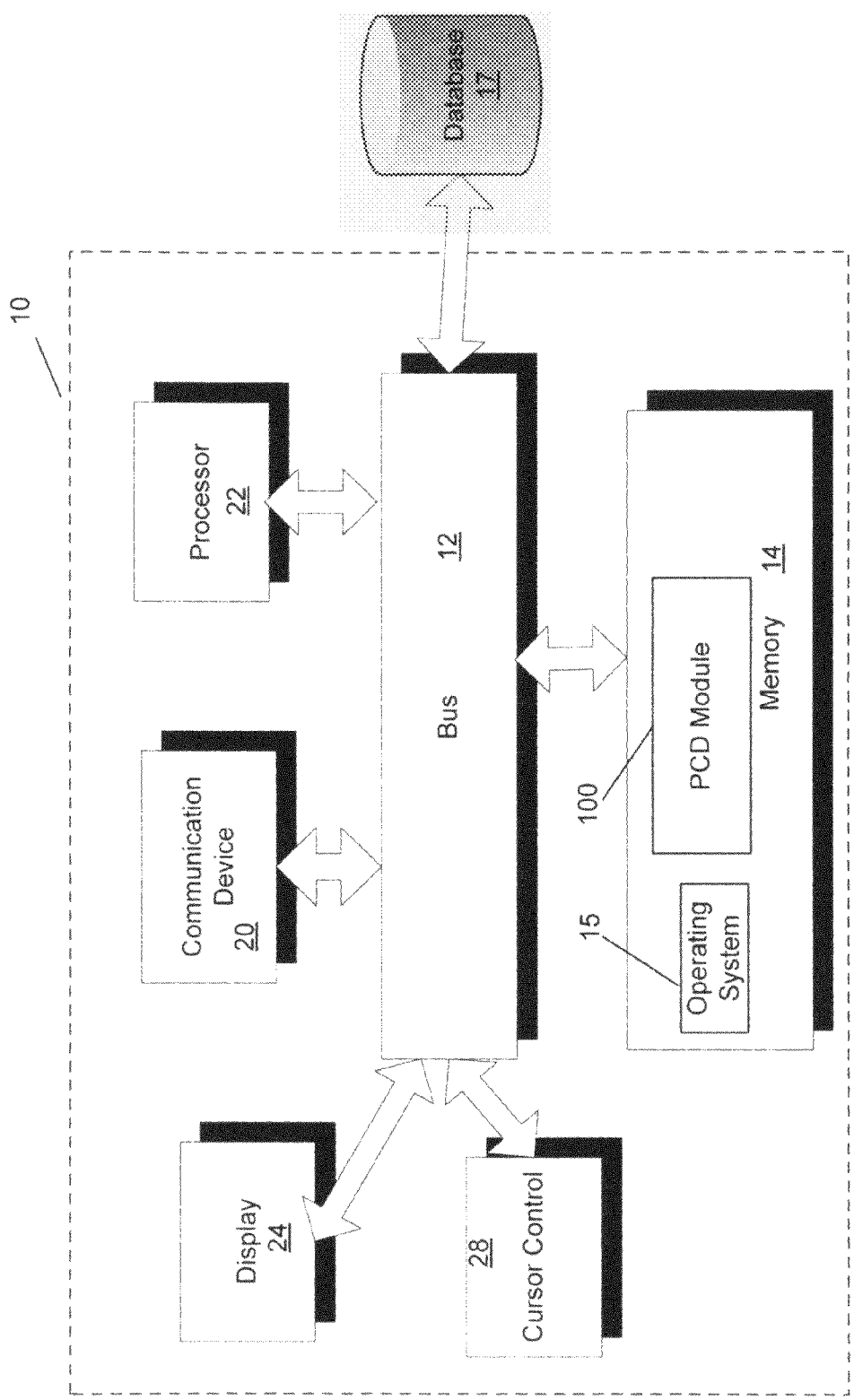
FIG. 1 is a block diagram of a system that can implement a personalized content delivery ("PCD") system in accordance with an embodiment.

FIG. 1 is a block diagram of a system 10 that can implement an embodiment of a PCD system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A cursor control device 28, such as a touch screen, is further coupled to bus 12 to enable a user to interface with system 10. In one embodiment, system 10 is a tablet PC.

In one embodiment, memory 14 stores software modules that provide functionality when executed by processor 22. The modules include an operating system 15 that provides operating system functionality for system 10. The modules further include a PCD module 100. This module is described in greater detail below. System 10 may further coupled to a database 17 for storing additional data.

Figure 2:
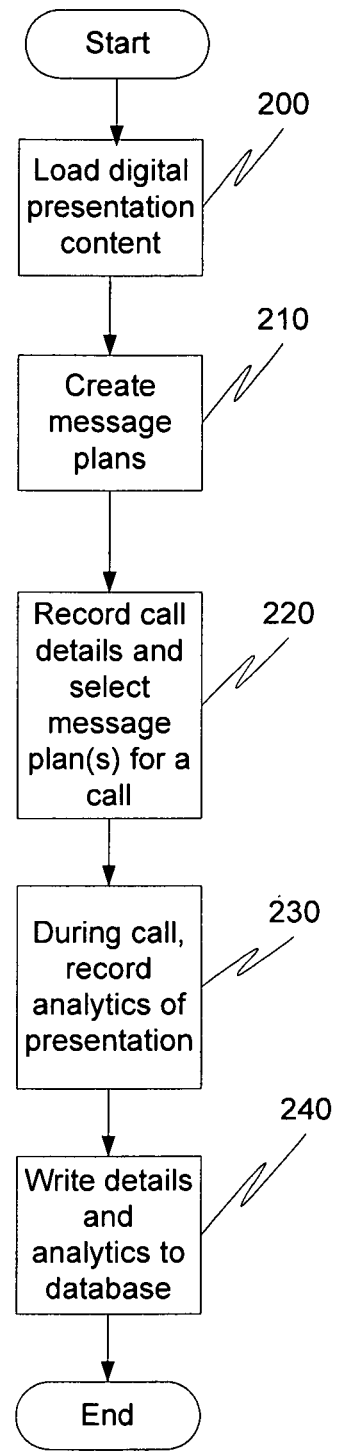
FIG. 2 illustrates a method of providing personalized content delivery and analytics in accordance with an embodiment.
Figure 3:
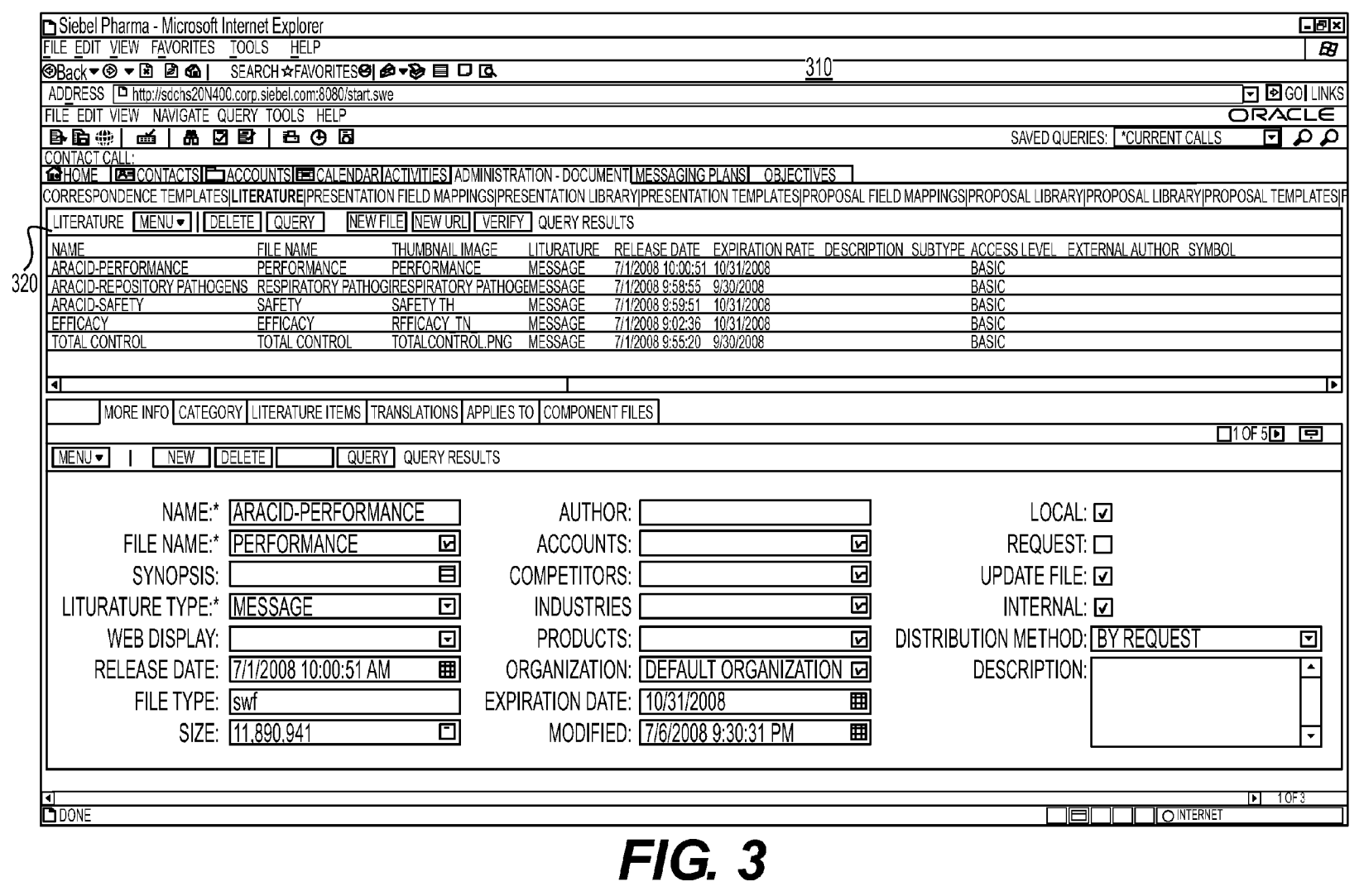

FIG. 2 illustrates a flow diagram of the functionality of PCD module 100 in accordance with an embodiment. In one embodiment, the functionality of the flow diagram of FIG. 2, and FIGS. 9 and 11 below, is implemented by software stored in memory and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. Initially, digital presentation content is loaded on the PCD system 10 (200). Digital presentation content may be used by brand managers, marketing managers and sales operation managers as a sales communication tool for more effective communication in order to acquire, retain and develop profitable customer relationships and improve marketing and sales effectiveness. Examples of digital presentation content includes presentations in the form of Flash files, PowerPoint files, word documents, movie files, Portable Document files, etc. A "message" refers to a slide, page or segment of a presentation conveying a specific message that managers wish to track. FIG. 3 illustrates an example screenshot of a user interface ("UI") 310 for PCD system 10 where an administrator or manager may load and manage digital presentation content. For example, UI 310 includes a literature panel 320 for displaying the various literature available for a particular product. In this case, the messages that can be displayed include messages regarding the performance, respiratory pathogens, safety, efficacy, and control associated with the product "Aracid." The literature may be, for example, a slide or slides with information about the product.

Figure 4:
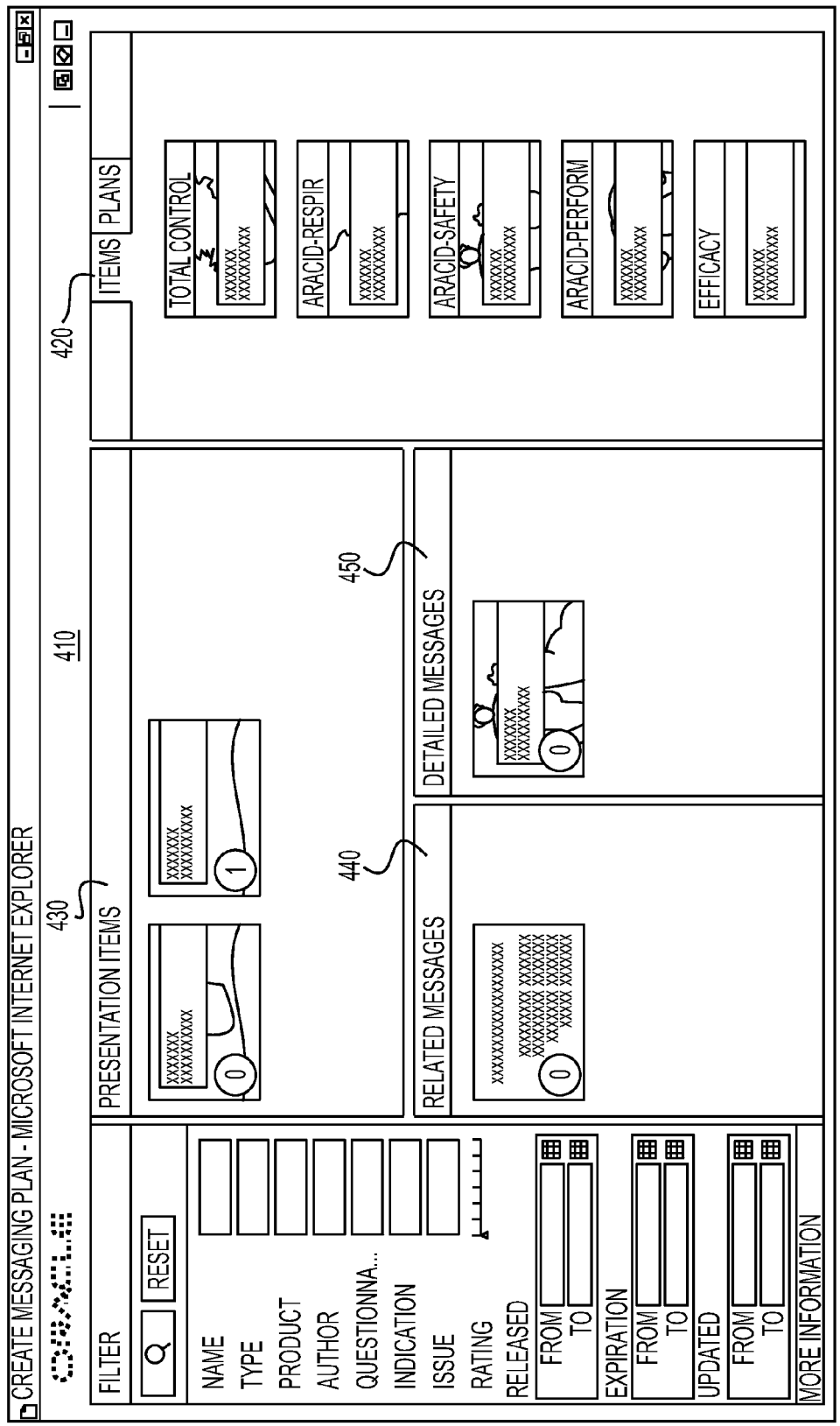
FIG. 4 illustrates an example message planning UI of the PCD system in accordance with an embodiment.

After loading the digital presentation content on PCD system 10, an administrator or manager may then create a "messaging plan" for the sales representative to use from the digital presentation content that was loaded using UI 310 (210). The messaging plan is a sequence of digital presentation content used to deliver the tracked message regarding the product. Whereas UI 310 allows an administrator to load content onto PCD system 10, PCD system 10 further includes a UI for creating the messaging plans from the digital presentation content. FIG. 4 illustrates an example screenshot of a UI 410 for PCD system 10 where an administrator or manager may create messaging plans. Note that messages from items panel 420 may be drag-and-dropped into presentation panel 430. The UI 410 may also display related messages 440 and detailed messages 450. A detailed message may be one that provides additional details on the topic covered by a message in the presentation panel. For example, if the presentation panel shows a message regarding the benefits of using "Aracid," the detailed message could be one that has a report of the clinical trials performed to prove the claimed benefits. When a sales representative makes a sales call, a messaging plan is selected on the PCD system 10 and details about the call are entered into the system (220).

Figure 5:
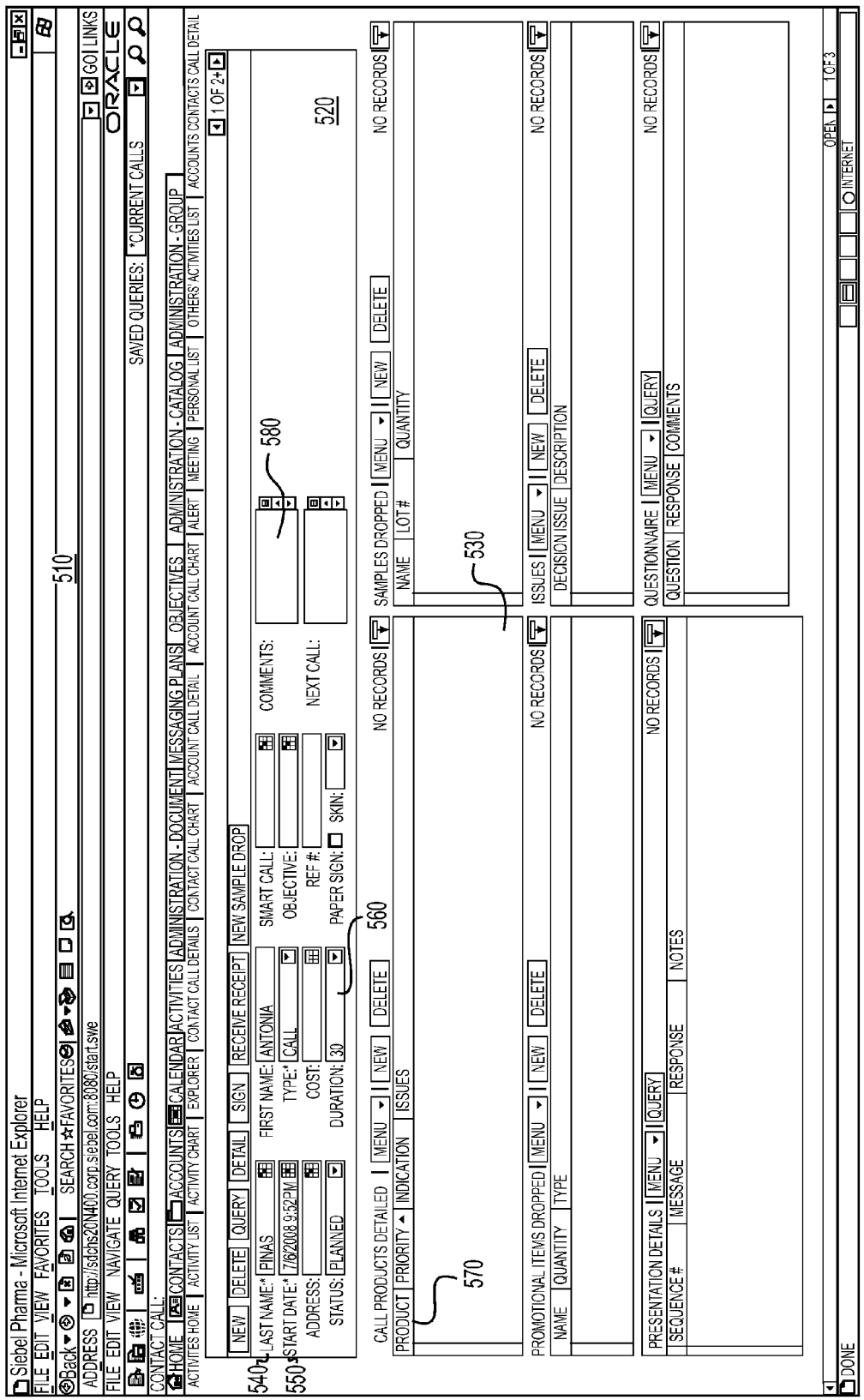
FIG. 5 illustrates an example call details UI of the PCD system in accordance with an embodiment.

FIG. 5 illustrates an example screenshot of a UI 510 for PCD system 10 where a sales representative may enter call details in details section 520 and product details section 530. Such details may include the doctor or audience of the call 540, the date of the call 550, the duration of the call 560, the product discussed during the call 570, and comments regarding the call 580. During the sales call, the PCD system 10 dynamically and automatically collects analytical data such as time spent by the sales representative on each message and the sequence of messages (230). For example, PCD system may include a timer (not shown) for recording the time spent on each message or segment of the message. FIG. 6 illustrates an example screenshot of a UI 610 for PCD system 10 where a presentation is in progress and displaying a message during a sales call.

Figure 7:
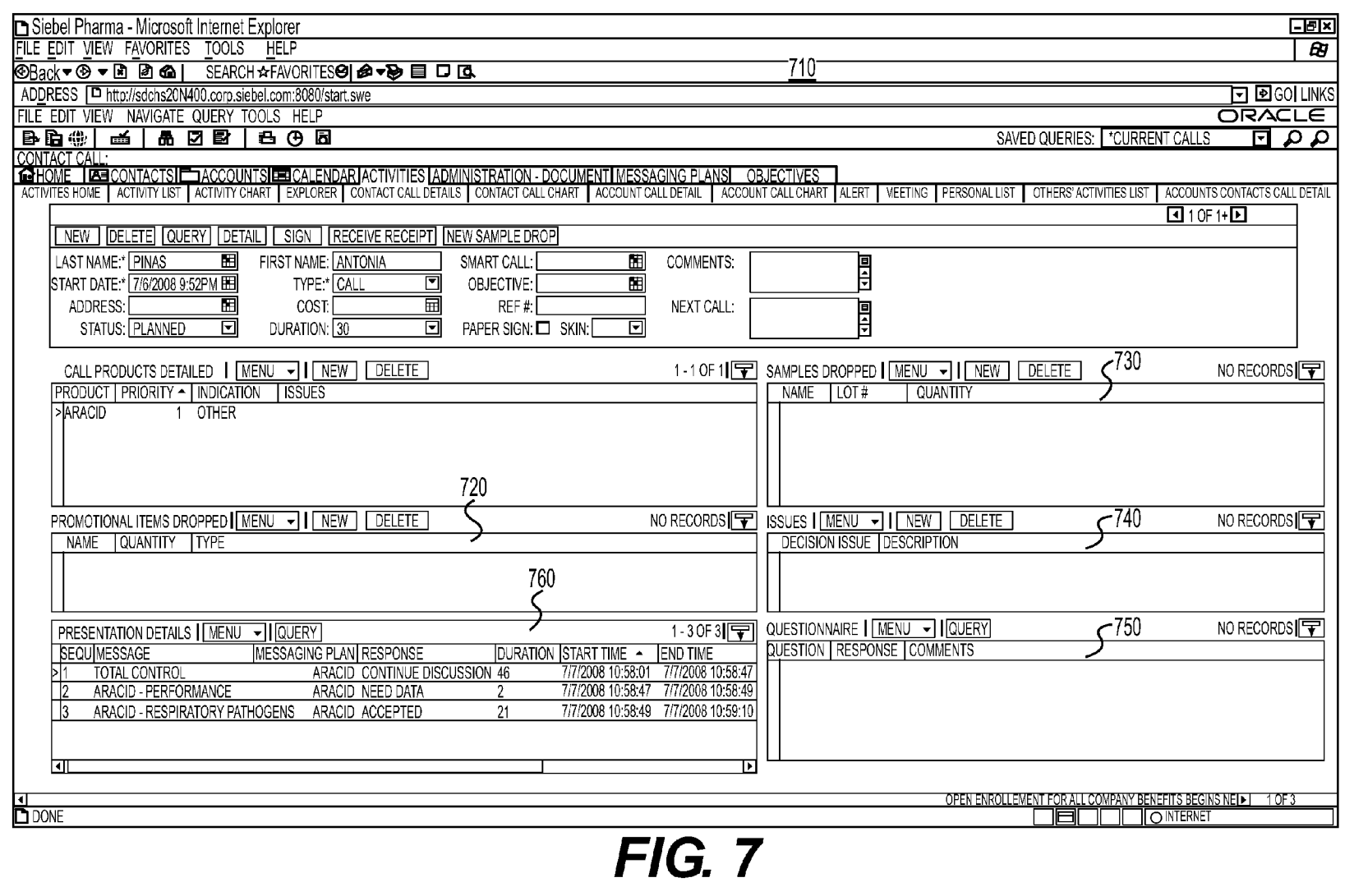

Once the detailing session is over and the interactive detailing is closed, the analytical data collected during the session is written back to database 17 (240). After the call, the sales representative may also enter additional details about the sales call such a samples and promotional items left with the doctor or audience, issues about the call, or questionnaires dropped during the call. FIG. 7 illustrates an example screenshot of a UI 710 for PCD system 10 where the sales representative can enter call details in promotional items section 720, samples dropped section 730, issues section 740, and questionnaires section 750. The screenshot UI 710 displays in presentation details section 760 the messages that were presented to the contact in the detailing session, the sequence of presented messages and their parent messaging plans (i.e., the message plan to which the messages belong), and duration of presentation of each message. Ultimately, information about the sales call and other sales calls regarding the same product may be used to develop marketing strategies for that product based on the success of the sales calls.

In one embodiment, the UIs for PCD system 10 are implemented using the Adobe Flex platform. Adobe Flex is a collection of technologies released by Adobe Systems for the development and deployment of cross platform rich Internet applications based on the proprietary Adobe Flash platform. Flex provides a workflow and programming model that is familiar to developers. Macromedia XML ("MXML"), an extensible Markup Language ("XML")-based markup language, offers a way to build and lay out graphic user interfaces. Interactivity is achieved through the use of ActionScript, the core language of Flash Player that is based on the European Computer Manufacturers Association ECMAScript standard. The Flex software development kit ("SDK") comes with a set of user interface components including buttons, list boxes, trees, data grids, several text controls, charts, graphs and various layout containers. Other features like web services, drag and drop, modal dialogs, animation effects, application states, form validation, and other interactions round out the application framework.

A Flex application may be a rich internet application ("RIA). RIAs introduce an intermediate layer of code, often called a client engine, between the user and the server. This client engine is typically downloaded as part of the instantiation of the application, and may be supplemented by further code downloads as use of the application progresses. The client engine acts as an extension of the browser, and usually takes over responsibility for rendering the application's user interface and for server communication. What can be done in a RIA may be limited by the capabilities of the system used on the client, but in general, the client engine is programmed to perform application functions that its designer believes will enhance some aspect of the user interface, or improve its responsiveness when handling certain user interactions, compared to a standard Web browser implementation. Also, while simply adding a client engine does not force an application to depart from the normal synchronous pattern of interactions between browser and server, in most RIAs the client engine performs additional asynchronous communications with servers.

In a multi-tiered model, Flex applications serve as the presentation tier. Unlike page-based hypertext markup language ("HTML") applications, Flex applications provide a stateful client where significant changes to the view do not require loading a new page. Similarly, Flex and Flash Player provide many useful ways to send and load data to and from server-side components without requiring the client to reload the view. To incorporate a Flex application into a website, one typically embeds a Shockwave Flash ("SWF") file in an HTML, JavaServer Pages ("JSP"), Adobe, Cold-Fusion, or other type of web page. The page that embeds the SWF file is known as the wrapper. A wrapper consists of an <object> tag and an <embed> tag that format the SWF file on the page, define data object locations, and pass run-time variables to the SWF file. In addition, the wrapper can include support for history management and Flash Player version detection and deployment.

The use of Flex provides a rich UI for the PCD system 10. However, in an embodiment, PCD system 10 is tightly integrated with customer relationship management ("CRM") software such as the Oracle® line of CRM products. Such Enterprise Application Systems ("EAS") products are typically designed with security as a major priority, and thus do not allow browser scripting. However, Flex requires Javascript to communicate with the underlying platform, and thus cannot make calls to secure EAS application program interfaces ("APIs").

Figure 8:
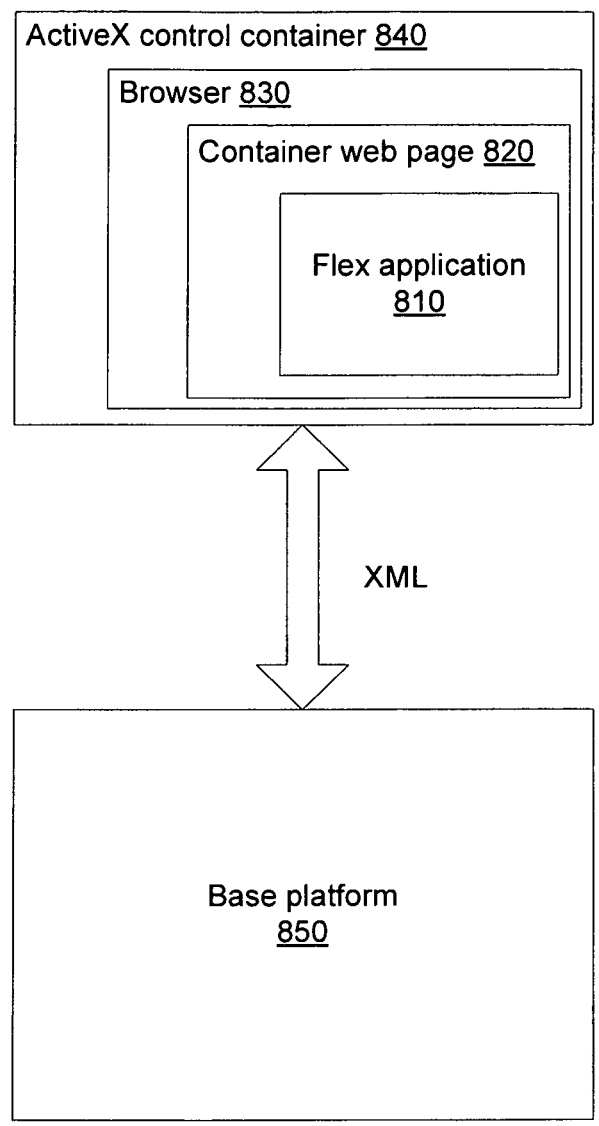
FIG. 8 illustrates a platform for Adobe® Flex communication in accordance with an embodiment.

Accordingly, to provide communication between the underlying platform and the Flex application, an embodiment embeds a browser control in an EAS-provided ActiveX container control, and this browser control navigates to an HTML page with Javascript code and the Flex application. This allows the Flex application to communicate via Javascript, and the Javascript can communicate with the ActiveX container control which can invoke EAS APIs. FIG. 8 illustrates logical view of an embodiment where a Flex application (SWF file) 810 is embedded in a container web page 820, which is viewed by a browser 830 communicating via ActiveX container control 840 with base platform 850. Sample code for container web page 820 is below, illustrating how Flex application 810 ("InteractiveDetailer.swf") may be embedded:

```
<script language="JavaScript">
    function InvokeMethod(strMode,strMethod,strArg)
    {
        var flashObject =
document.getElementById("InteractiveDetailer");
        var arg = "<invoke name=\"InvokeMethod\"
returntype=\"xml\"><arguments><string>" + strMode
            + "</string><string>" + strMethod +
"</string><string>"+strArg+"</string></arguments></invoke>";
        flashObject.CallFunction(arg);
    }
    function IsReady( )
    {
        window.external.ProcessFlashCall( );
    }
    function InvokeBasePlatformMethod(vMethod,vXMLData)
    {
        window.external.InvokeBasePlatformMethod(vMethod,vXML
    Data);
    }
<body>
    <object classid="clsid:D27CDB6E-AE6D-11cf-96B8-444553540000"
        id="InteractiveDetailer" width="100%" height="100%"
codebase="http://fpdownload.macromedia.com/get/flashplayer/current/
swflash.cab">
        <param name="movie" value="InteractiveDetailer.swf" />
        <param name="quality" value="high" />
        <param name="bgcolor" value="#869ca7" />
        <param name="allowScriptAccess" value="sameDomain" />
        <embed src="InteractiveDetailer.swf" quality="high"
```

-continued

```
bgcolor="#869ca7"
            width="100%" height="100%" name="InteractiveDetailer"
align="middle"
            play="true"
            loop="false"
            quality="high"
            allow.ScriptAccess="sameDomain"
            type="application/x-shockwave-flash"
            pluginspage="http://www.adobe.com/go/getflashplayer">
        </embed>
    </object>
</body>
```

Figure 9:
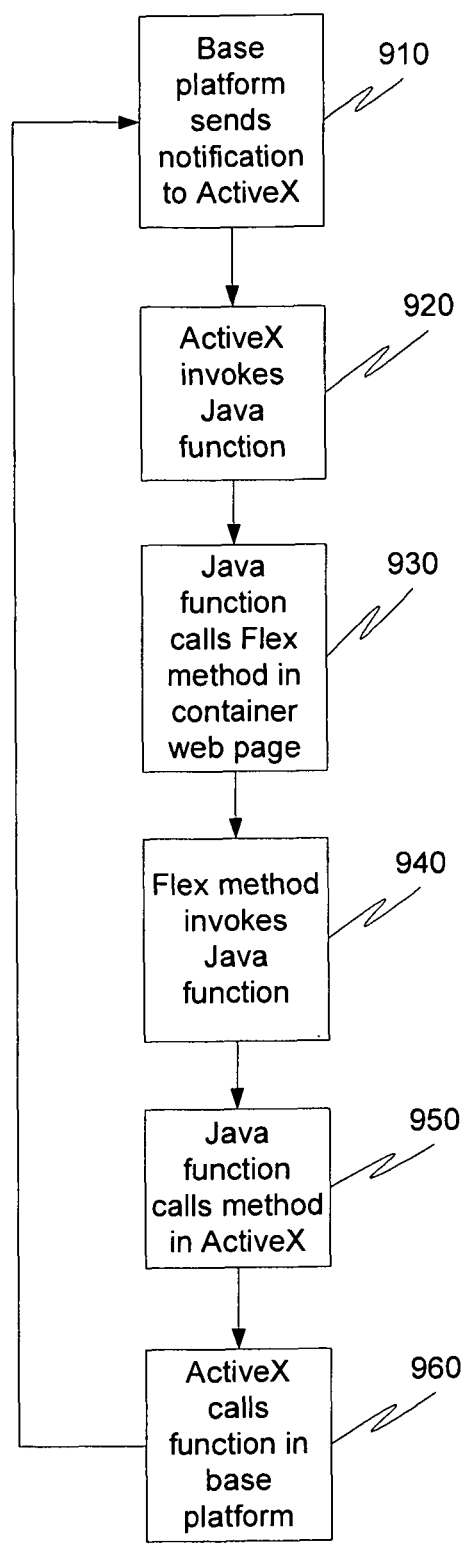
FIG. 9 illustrates a method of facilitating communication between an base platform and a Flex application in accordance with an embodiment.

FIG. 9 illustrates a flow diagram of the communication between a base platform 850 (e.g., Oracle® Life Sciences) and Flex-based UI (Flex application 810) for PCD system 10 in accordance with an embodiment. Reference is also made to FIG. 8. When data is to be sent from base platform 850 to Flex application 810, base platform 850 invokes a method in Flex by sending a notification to the ActiveX container control 840 with the Flex method name and arguments (data in XML format) as parameters (910). The ActiveX container control 840 then invokes a Javascript function "InvokeMethod" in container web page 820 with the Flex method name and arguments as IP parameters (920). The Javascript function then invokes the appropriate method in Flex application 810 in the container web page 820 via the Flash ActiveX API (930).

Similarly, when Flex application 810 invokes a method in base platform 850, Flex application 810 calls a Javascript function (e.g., "InvokeBasePlatformMethod") with the base platform method name and arguments as parameters (940). The Javascript of browser 830 will then call a method in the ActiveX container control 840 of the same name with the same arguments as parameters (950). ActiveX container control 840 then calls the method of the base platform 850, passing the arguments as XML data (960).

Figure 10:
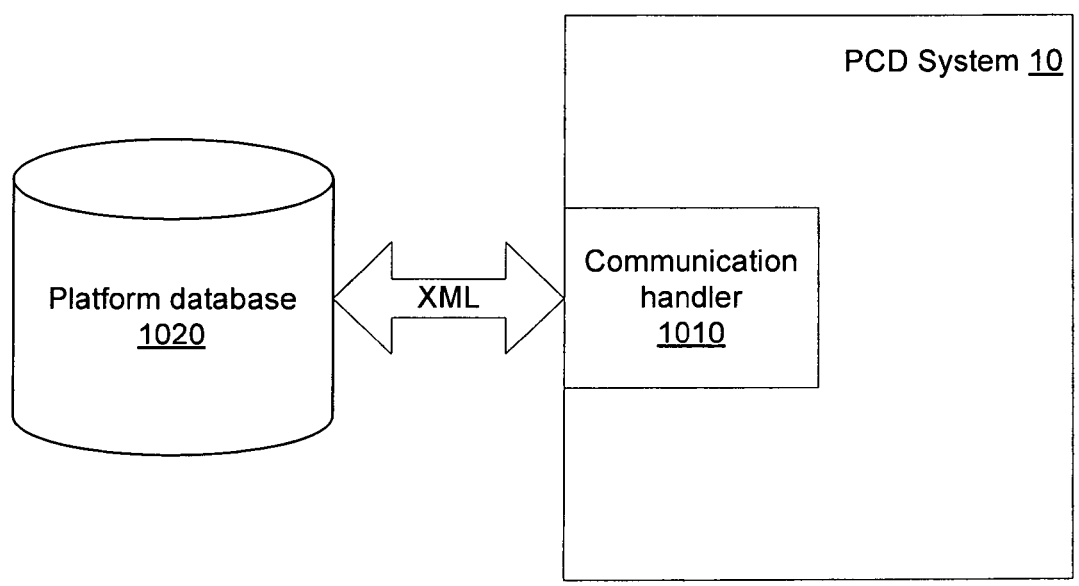
FIG. 10 illustrates a block diagram of a system including a communication handler in accordance with an embodiment.

Because of similar security concerns, Flex applications do not communicate with a base platform database and thus cannot invoke APIs to update the database. Accordingly, the PCD system 10 includes a communication handler for retrieving data and updating data in a platform database. FIG. 10 illustrates a communication handler 1010 that is part of PCD system 10. Communication handler 1010 handles all communication between the PCD system 10 and a platform database 1020. Communication handler 1010 reads the data received from the base platform database 1020 in XML format and caches it in memory. Communication handler 1010 also caches all analytical data tracked by the PCD system 10. During a sales call, PCD system 10 tracks information such as time spent on each message, sequence of presented messages, messaging plans that were presented, audience feedback, etc. This information is cached in memory by communication handler 1010 and dynamically updated during the detailing session. Once the sales presentation session is over, before closing the PCD system 10, the communication handler 1010 converts all cached data (to be written back to platform database 1020) into XML format and calls platform database APIs to write the collected data.

The communication handler 1010 is a collection of classes that encapsulate all the data required in PCD system 10. Objects of these classes parse XML data from the platform database 1020, and all data to be written back to platform database 1020 is packaged by these objects in XML format. When PCD system 10 is initialized, a global communication object is initialized which in turn initializes the objects that parse the XML data. The global communication object is accessible to all UI components in PCD system 10 and all data to be rendered in a UI is retrieved from this communication object. Moreover, all data to be written back to platform database 1020 is cached in the global communication object.

The communication handler has one main class called CommunicationObject which serves as a container class for holding objects of all other classes in the communication handler. When an application on PCD system 10 is initialized, a global object of type CommunicationObject is created as shown in code below:

```
package communicationhandler.utils
{
    import communicationhandler.common.CommunicationObject;
    import communicationhandler.common.AppMessageLog;
    public class GlobalAppObjs
    {
        private static var m_comObj        :CommunicationObject = new CommunicationObject( );
        private static var m_AppMsgLog     :AppMessageLog       = new AppMessageLog( );
        public static function get comObj ( ):CommunicationObject
        {
            return m_comObj;
        }
        public static function get AppMsgLog ( ):AppMessageLog
        {
            return m_AppMsgLog;
        }
    }
}
```

After initialization, when platform database 1020 sends data to PCD system 10, the global CommunicationObject created above receives the data from platform database 1020 and initializes objects that read and cache this data, as shown in code below:

```
public function Viewer::InvokeMethod(strMethod:String,
xmlString:String):void
        {
            if(strMethod == "InitISD")
            {
                ........
                GlobalAppObjs.comObj.InvokeMethod(strMethod,xmlString);
            ....
            }
        }
public function
CommunicatonObject::InvokeMethod(strMethod:String,xmlString:String)
:void
        {
            .....
            switch(strMethod)
            {
                .....
                case "InitISD":
                    InitISD(xmlString);
                    break;
            };
        }
public function InitISD(xmlString:String):void
{
AppConfig(GetSubString(xmlString,
XMLTagMap.SYS_PREF_DECOMP_PATH));
SetSalesAids(GetSubString(xmlString,
StringObj.IO_ADMIN_SALES_TOOL));
            if (Application.application.mode != "SA_VERIFY")
            {
SetSalesKits(GetSubString(xmlString,StringObj.IO_ADMIN_MP));
SetRecommendedMPs(GetSubString(xmlString,
"OptimizedDetailingPlan"));
            SetCallType
```

-continued

```
(GetSubString(xmlString,StringObj.XML_TAG_CALL_TYPE));
            SetCallData(GetSubString(xmlString, GetCallIO));
        }
        getPickListObjs(GetSubString(xmlString,
        "ListOfListOfValuesIO"));
    }
```

As CommunicationObject is a global object, all UI components have access to this object and retrieve data to be displayed from this object. Analytical data collected during the presentation session is also cached and dynamically updated in this object. Finally, before detailer is closed, the communication object converts all data to be written back into XML format and calls a platform API to save the data.

Consider a scenario where user clicks on a button to start a sales presentation. When the button is clicked, the platform database 1020 sends data such as call details (e.g. contact being called upon) and messaging plans/messages available for this contact, etc., to PCD system 10. The communication handler 1010 component receives the data from in XML format and instantiates objects that read and cache the XML data.

Figure 11:
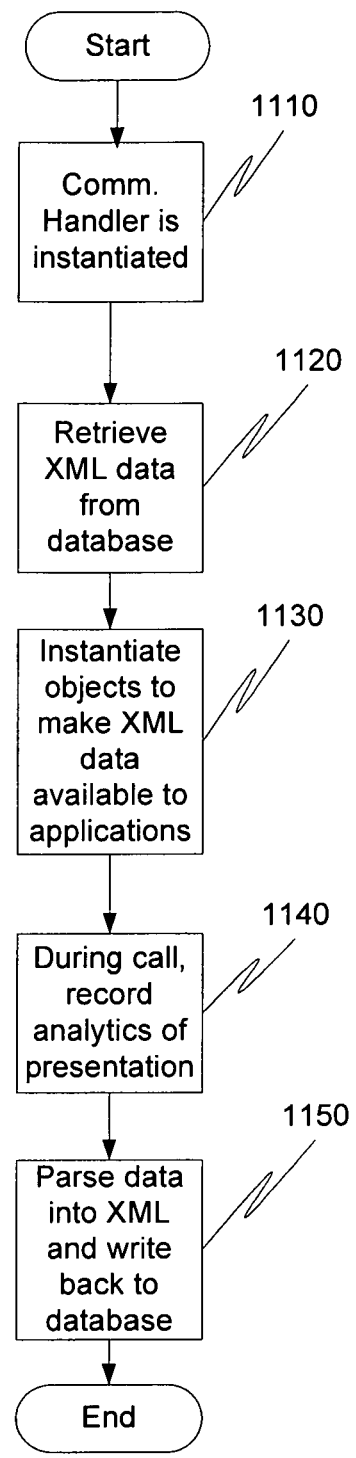
FIG. 11 illustrates a flow diagram of the function of the communication handler in accordance with an embodiment.

FIG. 11 illustrates a flow diagram of the function of communication handler 1010 in accordance with an embodiment. Reference is also made to FIG. 10. The PCD system 10 first initializes and instantiates communication handler 1010 (1110). Communication handler 1010 then retrieves data in the form of XML data from platform database 1020 (1120). Communication handler 1010 then instantiates objects to provide the XML data to the user interfaces of PCD system 10 applications (1130). During a sales presentation, communication handler 1010 caches analytics recorded by PCD system 10 (1140). After the sales presentation is over, communication handler 1010 parses the recorded data into XML data and calls platform database 1020 APIs to write the data back to platform database 1020 (1150).

Thus, integration of Flex or RIA technology with a secure EAS such as Oracle® Life Sciences makes it easier for sales representatives to deliver high impact presentations that are tailored to individual customer needs by leveraging multimedia visualization content provided by marketing teams. As a result, sales teams are better positioned to deliver the right message to the right customer at the right time, helping to optimize each selling opportunity and improve customer acquisition, satisfaction, and retention. On the other hand, no change is needed to the secure EAS to accommodate the Flex or RIA technology. The security protocols of the EAS may be left in tact.

Some embodiments of the invention have been described as computer-implemented processes. It is important to note, however, that those skilled in the art will appreciate that the mechanisms of the invention are capable of being distributed as a program product in a variety of forms. The foregoing description of example embodiments is provided for the purpose of illustrating the principles of the invention, and not in limitation thereof, since the scope of the invention is defined solely by the appended claims.

What is claimed is:

1. A method to facilitate communication between a rich Internet application and a secure Enterprise Application System (EAS) database, comprising:
    instantiating a rich Internet application that does not communicate with the secure EAS database;

instantiating a global communication handler application that communicates with the secure EAS database and the rich Internet application;
instantiating a global communication object that includes a secure application programming interface (API), an object that caches and provides a messaging plan to the rich Internet application, and an object that caches and provides analytical data to the secure EAS database;
retrieving, by the global communication handler application, a messaging plan including one or more messages of digital presentation content from the secure EAS database using the secure API;
caching the messaging plan in the global communication object;
providing the message plan to the rich Internet application;
receiving, by the global communication handler, analytical data from the rich Internet application;
caching the analytical data in the global communication object;
dynamically updating the cached analytical data in the global communication object during a session of the rich Internet application;
parsing the updated analytical data; and
after the session of the rich Internet application is over, writing, by the global communication handler application, the parsed analytical data to the secure EAS database using the secure API.

2. The method of claim 1, wherein the messaging plan includes information for a sales presentation.

3. The method of claim 1, wherein the EAS database is a life sciences database.

4. The method of claim 1, wherein the rich Internet application comprises a graphical user interface.

5. The method of claim 1, wherein all data received from and sent to the secure EAS database passes through the global communication handler.

6. The method of claim 1, wherein:
a format of the messaging plan is an extensible markup language (XML);
the global communication object is an ActiveX container provided by the secure EAS database;
the analytical data includes messages that were presented during the presentation, a message presentation sequence, and a time spent on each message; and
a format of the parsed analytical data is XML.

7. A non-transitory computer-readable medium having instructions stored thereon that, when executed by a processor, cause the processor to facilitate communication between a rich Internet application and a secure Enterprise Application System (EAS) database by:
instantiating a rich Internet application that does not communicate with the secure EAS database;
instantiating a global communication handler application that communicates with the secure EAS database and the rich Internet application;
instantiating a global communication object that includes a secure application programming interface (API), an object that caches and provides a messaging plan to the rich Internet application, and an object that caches and provides analytical data to the secure EAS database;
retrieving, by the global communication handler application, a messaging plan including one or more messages of digital presentation content from the secure EAS database using the secure API;
caching the messaging plan in the global communication object;
providing the message plan to the rich Internet application;
receiving, by the global communication handler, analytical data from the rich Internet application;
caching the analytical data in the global communication object;
dynamically updating the cached analytical data in the global communication object during a session of the rich Internet application;
parsing the updated analytical data; and
after the session of the rich Internet application is over, writing, by the global communication handler application, the parsed analytical data to the secure EAS database using the secure API.

8. The computer-readable medium claim 7, wherein the messaging plan includes information for a sales presentation.

9. The computer-readable medium of claim 7, wherein the EAS database is a life sciences database.

10. The computer-readable medium of claim 7, wherein the rich Internet application comprises a graphical user interface.

11. The non-transitory computer-readable medium of claim 7, wherein:
a format of the messaging plan is an extensible markup language (XML);
the global communication object is an ActiveX container provided by the secure EAS database;
the analytical data includes messages that were presented during the presentation, a message presentation sequence, and a time spent on each message; and
a format of the parsed analytical data is XML.

12. A system, comprising:
a secure Enterprise Application System (EAS) database;
a memory to store data and one or more software modules; and
a processor, coupled to the memory and the secure EAS database, configured to:
instantiate a rich Internet application that does not communicate with the secure EAS database;
instantiate a global communication handler application that communicates with the secure EAS database and the rich Internet application;
instantiate a global communication object that includes a secure application programming interface (API), an object that caches and provides a messaging plan to the rich Internet application, and an object that caches and provides analytical data to the secure EAS database;
retrieve, by the global communication handler application, a messaging plan including one or more messages of digital presentation content from the secure EAS database using the secure API;
cache the messaging plan in the global communication object;
provide the message plan to the rich Internet application;
receive, by the global communication handler, analytical data from the rich Internet application;
cache the analytical data in the global communication object;
dynamically update the cached analytical data in the global communication object during a session of the rich Internet application;
parse the updated analytical data; and
after the session of the rich Internet application is over, write, by the global communication handler application, the parsed analytical data to the secure EAS database using the secure API.

13. The system of claim 12, wherein the messaging plan includes information for a sales presentation.

14. The system of claim 12, wherein the database is a life sciences database.

15. The system of claim 12, wherein the rich Internet application comprises a graphical user interface.

16. The system of claim 12, wherein:
a format of the messaging plan is an extensible markup language (XML);
the global communication object is an ActiveX container provided by the secure EAS database;
the analytical data includes messages that were presented during the presentation, a message presentation sequence, and a time spent on each message; and
a format of the parsed analytical data is XML.

* * * * *

UNITED STATES PATENT AND TRADEMARK OFFICE
CERTIFICATE OF CORRECTION

PATENT NO. : 9,684,736 B2
APPLICATION NO. : 12/362416
DATED : June 20, 2017
INVENTOR(S) : Kumar et al.

It is certified that error appears in the above-identified patent and that said Letters Patent is hereby corrected as shown below:

On the Title Page

On page 2, Column 2, item (56) under Other Publications, Line 13, delete "Oracel" and insert -- Oracle --, therefor.

On page 3, Column 1, item (56) under Other Publications, Line 9, delete "lnglhein" and insert -- Ingelheim --, therefor.

In the Specification

In Column 6, Line 8, delete "allow.ScriptAccess" and insert -- allowScriptAccess --, therefor.

In Column 8, Line 51, delete "in tact." and insert -- intact. --, therefor.

In the Claims

In Column 10, Line 15, in Claim 8, after "medium" insert -- of --, therefor.

Signed and Sealed this
Thirteenth Day of February, 2018

Andrei Iancu
*Director of the United States Patent and Trademark Office*